Sept. 9, 1947.  C. W. HATKE  2,427,140
REEL END ALARM FOR MOTION PICTURE PROJECTORS
Filed June 15, 1945
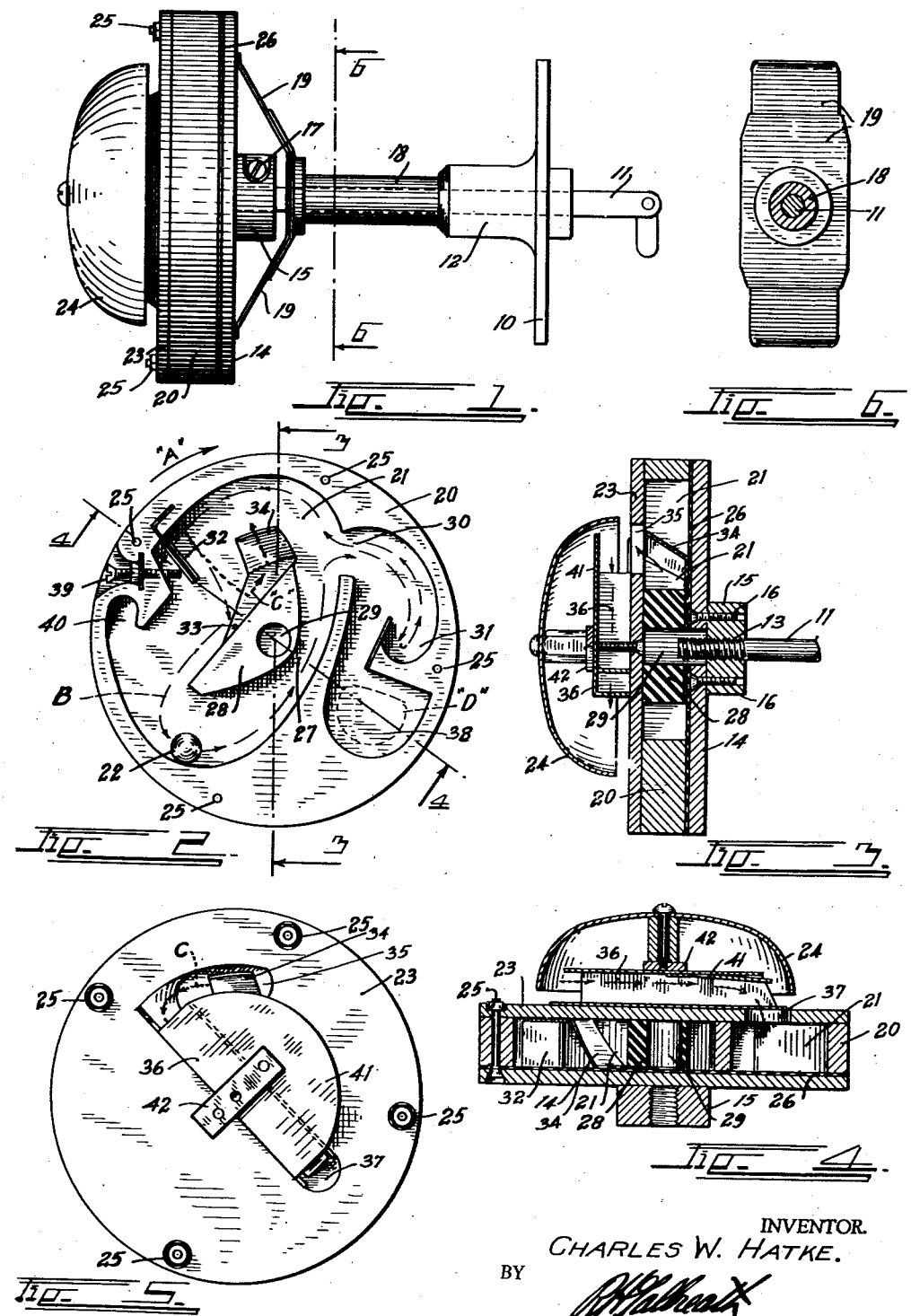
INVENTOR.
CHARLES W. HATKE.
BY
ATTORNEY.

Patented Sept. 9, 1947

2,427,140

UNITED STATES PATENT OFFICE 2,427,140

REEL END ALARM FOR MOTION-PICTURE PROJECTORS

Charles W. Hatke, Denver, Colo.

Application June 15, 1945, Serial No. 599,560

9 Claims. (Cl. 116—67)

This invention relates to an alarm for motion picture projectors and has for its principal object the provision of a simple and highly efficient device which can be quickly and easily installed upon any standard motion picture projector and which will give a signal to the operator when the end of the reel is being approached.

Another object of the invention is to so construct the device that it will require no attention at any time of any kind upon the part of the operator and yet will always be ready to give its indication at the proper time.

A further object is to provide a device of this kind which will not contact or interfere with the motion picture film and which will have no wearing parts; which will act as a brake to maintain the proper tension in the film.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved reel end alarm illustrating it in place on the unwinding shaft of a standard projector;

Fig. 2 is a face view of the improved alarm with the cover plate removed;

Figs. 3 and 4 are cross sections, taken on the lines 3—3, and 4—4, respectively, Fig. 2;

Fig. 5 is a face view of the alarm with the bell removed therefrom; and

Fig. 6 is a detail, cross section, taken on the line 6—6, Fig. 1.

The figures on the drawing are drawn to three-quarter scale.

The hub portion of the upper film or unwinding magazine of a standard motion picture projector is indicated at 10 with its bearing hub at 12 and its unwinding reel shaft at 11. The improved reel end alarm is designed to be mounted on the outer extremity of the reel shaft 10. The film in the upper magazine of the projector unwinds as the picture progresses and since the diameter of the reel is continually growing smaller the speed of the shaft 11 continually accelerates so that it is rotating at highest speed when the film is completely unwound. In the standard present day motion picture projectors when a new film reel is being started the reel shaft 10 will rotate from 10 to 15 R. P. M., depending upon the size of the reel, and the final speed, at the completion of the reel, is 65 R. P. M. This invention takes advantage of this speed acceleration to give an audible signal when the speed of the shaft 11 reaches a preset point.

The shaft 11 is conventionally provided with a helical braking spring which is clamped against the stationary hub 12 on the magazine by means of a nut threaded on a threaded extremity 13 on the shaft 11 to frictionally retard the rotation of the upper reel so as to place a proper tension on the film. In applying this invention, the conventional helical spring and nut are removed and discarded.

The alarm consists of a circular back plate 14 at the axis of which a threaded clamp nut 15 is attached in any desired manner such as by means of attachment screws 16. The nut 15 is threaded to receive the threaded extremity 13 and replaces the conventional nut thereon. The nut 15 is preferrably split and contains a clamping screw 17 by means of which it may be locked to the shaft 11.

The conventional brake spring is replaced by means of a spacing spool 18 to one extremity of which a resilient bowed, multiple leaf spring 19 is secured. The spool 18 is slipped over the extremity of the shaft 11. The nut 15 is then threaded thereon, until the back plate 14 contacts the ends of the spring 19 sufficiently to flex the latter, and is locked in place. The flexure of the spring 19 forces the end of the spool 18 against the stationary hub 12 to exert the required braking action. The leaf spring has an advantage over the usual helical spring in that there is no unwinding or reversing tendency when the shaft comes to rest which might create damaging looseness in the film.

A passage block 20 is secured or formed on the outside face of the back plate 14. A tortuous ball cavity 21 is formed in the block 20 to receive a relatively heavy ball 22 of steel or similar material. The cavity is closed by means of a cover plate 23 upon which a bell 24 of the "bicycle" type is mounted. The back plate 14 and the passage block 20 could be formed or molded as a single unit if desired. As illustrated, the back plate 14, the passage block 20 and the cover plate 23 are separated members clamped together by means of clamp bolts 25. It is preferred to clamp a cushion sheet 26 of rubber or similar material between the back plate and the block to prevent noise being caused by the rolling ball 22.

The construction and contour of the ball cavity can best be explained by tracing the path of the ball therethrough. Let us assume that the block 20 is rotated in the direction of the arrow A in Fig. 2. Gravity will tend to hold the ball at the lowest point at all times. As the block rotates, the ball will follow a path indicated by the broken line B first approaching a channel 27 adjacent the axis between the wall of the cavity and a center block 28 which is positioned at the axis and provided with a shaft opening 29. From thence, it rolls along the wall of the cavity to a throat 30 through which it falls into a hook-shaped pocket 31. Further rotation causes it to roll from the pocket 31 back into the main cavity and against an adjustable abutment pad 32. It lies against the pad 32 and is lifted thereby until the incline of the pad is sufficient to allow the ball to roll therefrom against a flat face 33 on the center block 28. From the flat face 33, the ball falls to its original position at the bottom of the cavity as shown in Fig. 2.

The ball continues to follow the above described path as the reel unwinds until a predetermined speed is reached. When the latter speed is reached, the ball will be carried sufficiently high by the abutment pad 32; the flat face 33 will have turned sufficiently far during the interval that the ball is falling; and the ball will rebound from the abutment pad 32 with sufficient force, to cause the ball to roll in the direction of the arrow C in Fig. 2 after striking the face 33 instead of returning to its original position.

The ball will now fall against an inclined deflecting plate 34 which is bent at an incline to throw the ball through an exit opening 35 in the cover plate 23 and into the bell 24 causing the latter to emit a single ring. It will then enter a guide tunnel tube 36 within the bell and, as the left end of the tunnel tube 36 elevates due to rotation, will roll down the tunnel tube striking the opposite side of the bell 24 causing the latter to emit a second ring. From the tunnel tube 36 the ball will fall through an entrance opening 37 in the cover plate into a retention chamber 38 where it will follow a closed path, as indicated by the broken line D until the speed is reduced whence it will return to its original path.

Thus, when any preset speed is attained, the bell will ring twice and no more. The presetting of the speed is accomplished by means of a set screw 39 which flexes the abutment pad 32, which is resiliently mounted, so that the latter will retain the ball a longer or shorter time as desired. After being once set, the device never needs further attention.

To prevent the bell from being rung from reversal of direction of the shaft during the changing of reels and during the "threading" of the projector a hook pocket 40 in addition to the hook-shaped pocket 31 is provided. These pockets catch and restrain the ball 22 from following its usual path during reverse rotation of the device.

A stop plate 41 is provided to prevent the ball from jumping over the tunnel tube into the bell. The bell is mounted on a bridge member 42 extending over the tunnel tube 36 so that the latter may extend across the axis of the bell.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A reel end alarm for motion picture projectors comprising: a housing; means for securing said housing on the unwinding reel shaft of said projector; an audible signal device; a passage in said housing; and a freely rolling ball in said passage, the latter being so contoured as to throw said ball against said signal device only when the speed of said shaft accelerates to a predetermined speed.

2. A reel end alarm for motion picture projectors comprising: a housing; means for securing said housing on the unwinding reel shaft of said projector; a passage in said housing lying in a plane at right angles to said shaft and forming an endless path about the axis thereof; a free rolling member in said passage; an abutment in said passage in the path of said rolling member; and an audible signal device positioned to be sounded by said rolling member in consequence of the latter striking said abutment with a sufficient force, said force being sufficient only when said housing is rotating at a pre-determined speed.

3. A reel end alarm for motion picture projectors comprising: a housing; means for securing said housing on the unwinding reel shaft of said projector; a passage in said housing lying in a plane at right angles to said shaft and forming an endless path about the axis thereof; a free ball in said passage; an abutment in said passage in the path of said ball; a deflecting member positioned to receive said ball from said abutment only when the speed of said shaft has accelerated to a predetermined point; and a bell positioned to receive and be struck by said ball after it leaves said deflecting member.

4. A reel end alarm for motion picture projectors comprising: a housing; means for securing said housing on the unwinding reel shaft of said projector; a passage in said housing lying in a plane at right angles to said shaft and forming an endless path about the axis thereof; a free ball in said passage; an abutment in said passage in the path of said ball; a deflecting member positioned to receive said ball from said abutment only when the speed of said shaft has accelerated to a predetermined point; a bell positioned to receive and be struck by said ball after it leaves said deflecting member, and a return passage positioned to receive said ball from said bell and return it to the first passage.

5. A reel end alarm for motion picture projectors comprising: a housing; means for securing said housing on the unwinding reel shaft of said projector; a passage in said housing lying in a plane at right angles to said shaft and forming an endless path about the axis thereof; a free ball in said passage; an abutment in said passage in the path of said ball; a deflecting member positioned to receive said ball from said abutment only when the speed of said shaft has accelerated to a predetermined point and deflect the ball through a first opening in the side of said housing; a bell carried on the latter side of said housing opposite said opening to be struck by the exiting ball; and means for returning said ball to said passage.

6. A reel end alarm for motion picture projectors comprising: a housing; means for securing said housing on the unwinding reel shaft of said projector; a passage in said housing lying in a plane at right angles to said shaft and forming an endless path about the axis thereof; a free ball in said passage; an abutment in said passage in the path of said ball; a deflecting member positioned to receive said ball from said abutment only when the speed of said shaft has accelerated to a predetermined point and deflect the ball through a first opening in the side of said housing; a bell carried on the latter side of said housing opposite said opening to be struck by the exiting ball; and a return passage across said bell to conduct said ball to the opposite side thereof to again strike said bell, there being a second opening in said side positioned to return said ball to the passage in said housing.

7. A reel end alarm for motion picture projectors comprising: a housing; means for securing said housing on the unwinding reel shaft of said projector; a passage in said housing lying in a plane at right angles to said shaft and forming an endless path about the axis thereof; a free ball in said passage; an abutment in said passage in the path of said ball; an audible signal device positioned to be sounded by said ball in consequence of the latter striking said abutment with a sufficient force, said force being sufficient only when said housing is rotating at a pre-determined speed; and hook-shaped pockets formed in the outer wall of said passage for receiving and preventing said ball from rolling in a reverse direction in said passage.

8. A reel end alarm for motion picture projectors comprising: a housing; means for securing said housing on the unwinding reel shaft of said projector; a passage in said housing lying in a plane at right angles to said shaft and forming an endless path about the axis thereof; a free ball in said passage; an abutment in said passage in the path of said ball; an audible signal device positioned to be sounded by said ball in consequence of the latter striking said abutment with a sufficient force, said force being sufficient only when said housing is rotating at a predetermined speed; and means for adjusting the position of said abutment.

9. A reel end alarm for motion picture projectors having a projecting unwinding shaft comprising: a circular back plate concentrically secured on said shaft; a passage block on the outer face of said back plate; a tortuous ball cavity formed in said block; a cover plate over said block closing said cavity; a loose freely rolling ball in said cavity, said ball tending to remain at the lowest point of said cavity under the influence of gravity so that when said block is rotated the inner wall of the cavity will move beneath the ball; an abutment extending inward from the wall of said cavity to contact and lift said ball to a point where the ball will roll and fall from said abutment; a flat receiving member in said cavity extending in a tangential plane adjacent the axis of said block and positioned to receive the ball falling from said abutment, the incline of said receiving member being such at low speeds that the ball will roll rearward and fall from its rear trailing edge down to the low point of said cavity for a second cycle and such that at a predetermined higher speed the ball will roll forwardly on said receiving member toward its forward edge; deflecting means at the forward edge of said receiving member positioned to direct the forwardly rolling ball through an opening in said cover plate; a concave bell on said cover plate with its concavity positioned over said opening to receive and be struck by said ball; and means in said bell for directing said ball through a second return opening in said cover plate communicating with the interior of the cavity in said block.

CHARLES W. HATKE.

REFERENCES CITED

The following references are of record in the file of this patent:

UNITED STATES PATENTS

| Number | Name | Date |
|---|---|---|
| 1,459,292 | Melotte | June 19, 1923 |
| 1,630,963 | Mortensen | May 31, 1927 |

FOREIGN PATENTS

| Number | Country | Date |
|---|---|---|
| 39,750 | Denmark | Jan. 28, 1929 |